3,179,580
METHOD FOR POLYMERIZING OLEFINS AND CATALYST COMPOSITION THEREFOR
Kenichi Fukui, Sakyo-ku, Kyoto, Joji Nakamura, Nishi-nomiya-shi, Sachio Yuasa, Sakyo-ku, Kyoto, Takeo Shimizu, Fushimi-ku, Kyoto, and Takezo Sano, Kishi-wada-shi, Japan, assignors to Sumitomo Chemical Company, Ltd., Osaka, Japan, a corporation of Japan
No Drawing. Filed May 5, 1961, Ser. No. 107,937
Claims priority, application Japan, May 16, 1960, 35/24,655; Jan. 14, 1961, 36/1,133
13 Claims. (Cl. 204—162)

This invention relates to a novel method for polymerizing olefins. In a particular aspect, this invention relates to a method for the polymerization of olefins by use of a new catalyst composition. In another aspect, the present invention relates to the provision of a new catalyst composition useful for the polymerization of olefins, said composition comprising, in admixture, (a) a substance of the composition represented by the formula $[MeO_2 \cdot (P_2O_5)_x]$ wherein Me means a metal selected from the group consisting of titanium, zirconium, hafnium and thorium and $x$ is a number of not more than 2.0; and (b) hydride or an organometallic compound of a metal selected from the group consisting of alkali metals, alkaline earth metals, zinc, cadmium, mercury, earth metals and rare earth metals.

With respect to the polymerization of olefins, a variety of methods have been proposed heretofore. All of these prior methods have the individual features varying depending upon the type of a catalyst used, or other conditions, but simultaneously they also accompany some weak points. By the way, a method of polymerizing olefins by use of a catalyst composition of the present invention has more advantages, as compared with the prior methods, in that polymerization reaction can be carried out at a lower temperature; that a polymer produced has a relatively higher degree of polymerization; that the polymerization velocity is high, i.e., the yield of the polymer per unit weight of the catalyst per unit time is exceedingly high; that the catalyst life is longer; and that the catalyst can be regenerated and reused. The present method is also distinguished from so-called Ziegler method in that a crystalline polymer having the different micro-structure is obtained.

It is accordingly one object of the present invention to provide a novel catalyst composition for conversion of olefins into high molecular polymers. Another object of the present invention is to provide a method for producing a high molecular polymeric compound having excellent properties under milder conditions than those of the prior methods.

Other objects, features and capabilities as comprehended by the present invention, will be apparent from the description and the claims which follow.

In order to attain these objects, a method for the polymerization of olefins is provided, in which an olefin is polymerized in the presence of a catalyst composition comprising, in admixture, component (a), namely a substance of the composition represented by the formula $[MeO_2 \cdot (P_2O_5)_x]$ wherein Me is a metal selected from the group consisting of titanium, zirconium, hafnium and thorium and $x$ is a number of not more than 2.4, and component (b), namely, hydride or an organometallic compound of a metal selected from the group consisting of alkali metals, alkaline earth metals, zinc, cadmium, mercury, earth metals and rare earth metals.

Suitable as the olefins which may be used herein are monoolefins having a double bond at the α-position, e.g., ethylene, propylene, 1-butylene, isobutylene, 1-pentene and the like; olefins having aromatic hydrocarbons substituent, e.g., styrene, α-methylstyrene and the like; conjugated diolefins such as butadiene, isoprene and the like; and a mixture containing two or more of polymerizable unsaturated hydrocarbons as enumerated above. More particular group of the olefins to be polymerized according to the invention includes unsaturated hydrocarbons having 2 to 5 carbon atoms and having at least one polymerizable ethylenic double bond.

These polymerizable monomers are polymerized by use of a catalyst composition of the present invention, thereby a polymer with the various properties depending on the type of said catalyst and the polymerization conditions employed (e.g., the type of solvent, polymerization temperature, polymerization pressure, etc.) being obtained. Further, not only a homopolymer can be produced from the polymerizable unsaturated monomer but also a copolymer can be produced by employing a plurality of said monomers in accordance with the process of the present invention. For instance, an elastic solid copolymer can be obtained by copolymerization of ethylene and propylene in accordance with the process of the present invention.

A catalyst composition of the present invention includes two components, one of which is designated herein as component (a) and the other as component (b) for convenience.

The component (a) is a substance of the composition represented by the formula $[MeO_2 \cdot (P_2O_5)_x]$ wherein Me and $x$ are the same as defined above. Said formula may be deemed as standing for either a phosphate of Me, or a mixture composed of a phosphate of Me as the main component and besides $MeO_2$ and/or $P_2O_5$. In the above formula, Me is titanium, zirconium or hafnium of Group IVa in the periodic system, or thorium, and $x$ is a number of not more than 2.0. Typical compounds corresponding to the formula are titanyl pyrophosphate $(TiO)_2 \cdot P_2O_7$ or $2TiO_2 \cdot P_2O_5$ ($n=\frac{1}{2}$); zirconyl pyrophosphate $(ZrO)_2 \cdot P_2O_7$ or $2ZrO_2 \cdot P_2O_5$ ($n=\frac{1}{2}$); titanyl metaphosphate or titanium pyrophosphate $TiO \cdot (PO_3)_2$ or $TiP_2O_7$, $TiO_2 \cdot P_2O_5$ ($n=1$); zirconyl metaphosphate or zirconium pyrophosphate $ZrO \cdot (PO_3)_2$ or $ZrP_2O_7$, $$ZrO_2 \cdot P_2O_5$$

($n=1$); hafnyl metaphosphate or hafnium pyrophosphate $HfO \cdot (PO_3)_2$ or $HfP_2O_7$, $HfO_2 \cdot P_2O_5$ ($n=1$); thorium pyrophosphate $ThP_2O_7$, $ThO_2 \cdot P_2O_5$ ($n=1$); thorium orthophosphate $Th_3(PO_4)_4$, $3ThO_2 \cdot 2P_2O_5$ ($n=\frac{2}{3}$) thorium metaphosphate $Th(PO_3)_4$, $ThO_2 \cdot 2P_2O_5$ ($n=2$). Most of these compounds are already known in literatures. Through the examination of these compounds prepared by the usual way, it has now been found that they do not always exactly correspond to the above-said composition. By the way of illustration, a dilute solution of titanium tetrachloride in hydrochloric acid was mixed with a solution of equimolar orthophosphoric acid in water, and the resulting precipitate was collected by filtration and then calcined for several hours. The product thus obtained did not correspond to $2TiO_2 \cdot P_2O_5$ in composition but it was found to have a complicated composition of $1.8\ TiO_2 \cdot P_2O_5$ ($n=1/1.8$). X-ray diffraction pattern of the product obtained by calcining at 700° C. or higher shows sharp peaks. The lattice constants calculated from the value of said peaks are not consistent with any of $TiO_2 \cdot P_2O_5$ and $TiP_2O_7$ and, accordingly, the product may be in a different type having the complicated composition as above-indicated. Another product obtained from an aqueous zirconium oxychloride solution and an aqueous orthophosphate solution in the same manner as above exhibits the approximate composition of $ZrO_2 \cdot P_2O_5$ as determined by chemical analysis. The product if it has been calcined at above 900° C. shows peaks due to the existence of crystallinity as determined by X-ray diffraction method. The lattice constants calculated from the value of said peaks are well consistent with that of $ZrP_2O_7$.

As stated above, these composition formulas which are referred to in the prior literatures are for convenience only. Thus, a variety of compounds and mixtures which fall in the composition of the general formula

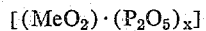

$$[(MeO_2) \cdot (P_2O_5)_x]$$

and which are known or unknown can be effectively utilized as one of the components of the catalyst composition of the present invention. Of course, these compounds may be used singly or in combination, and also a co-precipitated substance may be used. In such co-precipitation method for the preparation of the substance of the above-said composition, two or more water-soluble salts of titanium, zirconium, hafnium or thorium can be combined with phosphoric acid or a water-soluble phosphoric acid salt, thereby to form a substance of such composition in which Me consists of more than one metal. In the present invention, a mixture of a compound of the composition $[(MeO_2) \cdot (P_2O_5)_x]$ with at least one $MeO_2$, that is, titania, zirconia, hafnia and thoria, or with $P_2O_5$, may be used as the component (a). With respect to the suffix $x$ of the above-indicated general formula, a number of not more than 2 is suitable. In this case, $P_2O_5$-portion should be present in at least a substantial amount, i.e., the case wherein $x$ is equal to zero is excepted, and preferably $x$ is more than $\frac{1}{10}$. However, an excess of $P_2O_5$-portion can not provide any contribution to the activity of the catalyst obtained, and therefore the upper limit of $x$ is 2.0 and preferably 1.0. Thus the component (a) of the catalyst composition of the present invention may be a commercially available material, or it may be prepared by any of the known methods or the modification thereof. For instance, it can be prepared by reacting a water-soluble salt of titanium, zirconium, hafnium or thorium, e.g., the halide, oxyhalide, nitrate, etc., with phosphoric acid or the water-soluble salt thereof, e.g., alkali metal phosphate, ammonium phosphate, etc. Usually, both of the reactants in individual solutions are mixed at a proper molar ratio to precipitate a product having the desired composition. It is convenient to heat the product under atmospheric or reduced pressure so as to remove water prior to its use. The complete removal of water from a component (a), however, is not always needed if a sufficient amount of component (b) to be combined with said component (a) is used. This means that the heating is not essential. If the further addition of $MeO_2$ to the resultant product as component (a) is contemplated, it may be mixed to the component (a) prior to, or simultaneously with, the combination with a component (b). Alternatively, $MeO_2$ may be added to the said component (a) during, or prior to, the preparation of the said component (a) by precipitation method.

The commercially available, or thus prepared component (a) may preferably be calcined prior to the combination with the component (b.) The calcination is carried out at a temperature ranging between about 100° C. and about 1200° C., more particularly between about 300° C. and about 700° C. By such calcination, the activity of the catalyst composition of the invention is extremely increased.

Further, there is another preferable embodiment of the present invention wherein, prior to the combination of a component (a) with a component (b), the former is treated with hydrogen. In order to carry out this embodiment in effect, the component (a) is treated in hydrogen stream at a temperature of about 200° C. to about 700° C. and preferably about 400° C. to about 500° C. for several to several ten hours, for example, for two to thirty hours and preferably for one hour to eight hours. The mixture of such component (a) as having been treated in the above-mentioned manner with a component (b) shows remarkably greater catalytic activity than that of the mixture of an untreated component (a) with a component (b) and it also provides the production of a desired polymer in a very good yield. The reason why the catalytic activity is increased by the hydrogen treatment of the component (a), is not clear, but it has been found that such increase in catalytic activity is particularly appreciable when Me in the general formula of a component (a) is zirconium, and that it can be highly developed when the monomer to be polymerized is ethylene or a mixture of ethylene with other olefin or olefins.

Component (b) of a catalyst of the present invention is hydride or an organomentallic compound of a metal selected from the group consisting of alkali metals, alkaline earth metals, zinc, cadmium, mercury, earth metals and rare earth metals. These are commonly known as reducing catalyst in the polymerization of a variety of olefins. Suitable as the organic compounds of these metals are alkyl metal compounds, alkyl metal hydrides, alkyl metal halides, alkoxyl metal compounds or those in which a part, or whole, of the alkyl portion of the above-enumerated compounds are replaced by cycloalkyl, aryl or aralkyl radical. Typical compounds are lithium hydride, sodium hydride, potassium hydride, calcium hydride, aluminum hydride, lithiumaluminum hydirde, boron hydride, sodium borohydride, butyllithium, amylsodium, phenylsodium, dimethylmagnesium, diethylmagnesium, diethylzinc, diethylcadmium, triethylboron, ethylmagnesium bromide, butylmagnesium chloride, phenylmagnesium bromide, triethylaluminum, tripropylaluminum, triisobutylaluminum, trioctylaluminum, tridecylaluminum, dimethylaluminum chloride, diethylaluminum bromide, diethylaluminum chloride, ethylaluminum dichloride, ethylaluminum sesquichloride, dipropylaluminum fluoride, diisobutylaluminum fluoride, diethylaluminum hydride, ethylaluminum dihydride, diisobutylaluminum hydride, sodiumaluminum tetraethyl, lithiumaluminum tetraoctyl, diethylaluminum ethoxide and the like. Of, sodium methoxide, potassium ethoxide, or aluminum ethoxide may advantageously be used for the combination with such compound. Of course, these compounds may be used singly or in combination as the component (b) of a catalyst composition of the present invention.

It has been therefore known that some of the compounds usable as the component (a) of the catalyst composition of the present invention can show effectiveness for promoting the polymerization of olefins to some extent. However, the olefin polymer obtained has a lower molecular weight and is liquid. On the contrary, when employing the combination of the component (a) with the component (b) in the present invention, a solid, high molecular weight olefin polymer is obtained in simpler and more economical manner than in the prior art.

It has also been known heretofore that the combination of a metal oxide (e.g., the oxide of vanadium, thallium, chromium, molybdenum, wolfram, etc.) with the aforesaid component (b) is used as catalyst for the polymerization of olefins. However, the combination of the oxide of a metal of Group IVa in the periodic table (e.g., titanium, zirconium and hafnium) or the oxide of thorium with the aforesaid component (b) can only show very low catalytic activity for the polymerization of olefins and is practically ineffective. In the present invention, on the contrary, the combination of the phosphoric acid salt of a metal of Group IVa in the periodic table, or of thorium, with the aforesaid component (b) can produce olefin polymer at a high conversion.

The molecular weight of the polymer obtained by the method of the invention is higher, for example reaching order of as high as $10^7$. High molecular weight ethylene polymer obtained by the present invention shows the excellent crystallinity.

The ratio of a component (a) to a component (b) in the catalyst composition of the present invention may vary within the broad range. For instance, the molar ratio of the component (a) to the component (b) is from 1:0.05 to 1:100, and preferably from 1:0.2 to 1:10. The ratio of the components (a) to (b) has an influence upon the properties of the polymer produced. In the polymerization of propylene, for example, if the ratio of the components (a) to (b) is kept below a definite value, a liquid material will be increased in the polymerization product.

A catalyst composition of the present invention can be used in combination with any other known polymerization catalyst, so far as they are consistent with each other. If desired, a catalyst composition of the present invention may be used on a suitable carrier. Silica, alumina, silica-alumina or clays can be used for this purpose. Generally, it is convenient to incorporate a carrier during the preparation of the component (a), but sometimes it is also possible to add a carrier during the admixing process of the components (a) and (b).

The polymerization reaction by use of the catalyst composition of the present invention may be carried out in the presence of a solvent or a diluent with advantages. Suitable as the solvent for the instant reaction system are inert hydrocarbons, e.g., butane, pentane, hexane, heptane, isooctane, cyclohexane, methyl cyclohexane, benzene, toluene, xylene, tetralin, decalin, and other aliphatic, alicyclic or aromatic hydrocarbons or a mixture thereof, or petroleum fractions free from polymerizable unsaturation. Halogen-substituted aromatic hydrocarbons may also be usable, including chlorobenzene, chloronaphthalene, etc.

As still another preferable embodiment of the present invention, the instant polymerization system may be exposed to irradiation of ionizing radiation during or after a polymerizable monomer is brought into contact with a catalyst composition consisting of the aforesaid components (a) and (b), whereby the polymerization reaction readily proceeds even at a very lower temperature, with increased polymerization velocity. As the ionizing radiation preferred are $\alpha$-ray, high velocity electron, $\gamma$-ray and neutron, from various sources, one or more of which can be applied to the polymerization system at a radiation dose rate of about $10^3$-$10^7$ roentgens/hour for a period of from several minutes to several hours.

A process for polymerizing olefins by use of a catalyst composition of the present invention can be carried out in batch type, semi-continuous type or continuous type. Polymerization temperature and polymerization pressure may vary depending on the type of monomer, the catalytic activity of the catalyst system, desired degree of polymerization, etc. Generally, the present polymerization reaction can be carried out at a temperature of lower than about 300° C., and sometimes at a temperature of lower than 0° C., for example up to −100° C., and preferably at a temperature of 0-200° C. Polymerization pressure may be subatmospheric, or superatmospheric pressure up to about 300 atm. and preferably from atmospheric pressure to about 100 atm.

Generally, when using a solvent or a diluent in the instant polymerization reaction, it is convenient to introduce olefin into a dispersion containing a catalyst of the present invention in said solvent or diluent. The catalyst composition may be added in its whole amount to the polymerization system at the start of the polymerization, or it may be added portionwise over the period for the said polymerization.

In order to carry out the present invention by a continuous or semi-continuous process, the contact between a catalyst and a monomeric olefin can be effected by various ways. For example, the olefin can be contacted with the catalyst in the form of a fixed bed, a slurry, a fluid bed or a movable bed.

In order to recover a produced polymer from the polymerization system, the crude polymerization product is taken up and subjected to solvent extraction, hot filtration under a pressure or centrifugal separation, to yield a substantially pure polymeric product.

In order to decompose the component (b) in the catalyst composition, a hydrochloric acid-methanol mixture, for example, may be added to the reaction system, or to the residual catalyst mixture.

The separated component (a) may be reused as it is, or regenerated after adequate treatments for purification and reactivation.

The selection of the polymerization conditions for the process of the present invention, as well as the method for the recovery and purification of the polymeric product, will be understood by those skilled in the art from the conventional low or moderate pressure polymerization processes for olefins.

In case of ethylene polymerization, the yield of the polymer per unit weight of catalyst per unit time, as well as the degree of polymerization, using the catalyst composition of the present invention, is higher than that of molybdena-alumina or chromia-silica-alumina catalyst, and is comparable with that of the Ziegler type catalyst. However, the polymer yielded by the present invention has a remarkably different micro-structure from the Ziegler type polymer; the former having a less number of methyl groups, i.e., less branched structure, and the double bonds in the former being mainly composed of terminal vinyl groups (cf. Example 13).

The following example will serve to show the present invention in details by way of illustration and not by way of limitation.

EXAMPLE 1

A solution of titanium tetrachloride in a dilute hydrochloric acid is mixed with an aqueous solution of orthophosphoric acid in the equimolar amount, to produce titanyl pyrophosphate ($2TiO_2 \cdot P_2O_5$), which is calcined for five hours at 400–500° C. prior to its use.

Into a stainless steel autoclave having the internal volume of 100 cc., and equipped with an electromagnetically driven, longitudinally movable stirrer, the resulting catalyst is charged, and then the air in the autoclave is replaced by nitrogen through alternative evacuation and charge of nitrogen.

Then, aluminum triethyl and heptane are charged under flow of nitrogen stream. After heating the autoclave to 150° C. under stirring, ethylene is fed therein to a gauge pressure of 40 kg./cm.², and the reaction is effected at this temperature with stirring. After cooling the reaction mixture, a polymer is taken out and treated with methanol-hydrochloric acid mixture. The solid obtained is washed well with methanol and then dried, followed by extraction with hot xylene and precipitation with methanol, thereby white solid polyethylene being obtained.

In this example, the charged amonuts of triethyl aluminum and titanyl pyrophosphate, respectively, are varied to examine their influence to the yields. The experimental results will be shown in the following table. In each run 50 cc. of n-heptane is used.

Table 1

| Run No. | 2TiO₂·P₂O₅ (g.) | AlEt₃ (g.) | Al/Ti Molar ratio | Time, hr. | Yield (g.) | Yield/gram 2TiO₂·P₂O₅ | M.W.×10⁻⁴ |
|---|---|---|---|---|---|---|---|
| 1-1 | 5.30 | 0.5 | 0.125 | 6.5 | 2.3 | 0.43 | 57 |
| 1-2 | 2.66 | 0.5 | 0.25 | 3.0 | 2.8 | 1.05 | 180 |
| 1-3 | 1.33 | 0.5 | 0.50 | 3.5 | 3.0 | 2.66 | 148 |
| 1-4 | 0.67 | 0.5 | 1.0 | 3.0 | 2.1 | 3.13 | 230 |
| 1-5 | 0.34 | 0.5 | 2.0 | 3.0 | 1.3 | 3.83 | 228 |
| 1-6 | 0.67 | 1.0 | 2.0 | 3.0 | 1.3 | 1.94 | 274 |
| 1-7 | 0.67 | 2.0 | 4.0 | 3.0 | 1.0 | 1.49 | 234 |
| 1-8 | 0.67 | 4.0 | 8.0 | 3.0 | 1.2 | 1.80 | 129 |
| 1-9 | 0 | 0.5 | — | 3.5 | 0 | 0 | — |

The infrared absorption spectrum of a film produced from the polymer of Run No. 1–1 shows the presence of not more than two methyl groups and of 0.8 double bond per one thousand carbon atoms, with the distribution of the type of the said double bonds being $RCH=CH_2$, 90%; $RR'C=CH_2$, 10% and $RCH=CHR'$ (trans), 0%. These figures are specific, when compared with those of the polymers known heretofore (cf. for example, Ind. Eng. Chem. 48, 1161 [1956]).

EXAMPLE 2

In this example, calcining temperature for titanyl pyrophosphate, obtained in the same manner as in Example 1, is varied to examine the influence of said temperature to the polymerization of ethylene. Into a reaction vessel, 0.67 g. of $2TiO_2·P_2O_5$, 0.5 g. of aluminum triethyl and 50 cc. of n-heptane are charged, and then ethylene is fed therein to have the initial pressure of 40 kg./cm.² at polymerization temperature of 150° C. Polymerization reaction is effected in the same manner as in Example 1. The experimental data are set forth in the following table. The calcining period of the catalyst in each run is 5 hours.

Table 2

| Run No. | Calcination temp. of catalyst (° C.) | Time (hr.) | Yield (g.) | Yield/gram 2TiO₂·P₂O₅ | M.W.×10⁻⁴ |
|---|---|---|---|---|---|
| 2-1 | 100 | 3.0 | 0.1 | 0.2 | — |
| 2-2 | 300 | 6.0 | 0.8 | 1.2 | — |
| 2-3 | 500 | 3.0 | 2.1 | 3.1 | 230 |
| 2-4 | 600 | 3.0 | 2.1 | 3.1 | — |
| 2-5 | 700 | 4.5 | 0.4 | 0.6 | 153 |
| 2-6 | 800 | 3.0 | 0.2 | 0.3 | — |
| 2-7 | 1,000 | 3.0 | 0.8 | 1.2 | 203 |

EXAMPLE 3

In this example, runs are carried out at different polymerization temperatures. Catalyst used is composed of 0.67 g. of $2TiO_2·P_2O_5$ and 1.0 g. of aluminum triethyl, and solvent is 50 cc. of n-heptane. In each run of this example, ethylene is continuously supplied to constantly maintain the reaction pressure at 40 kg./cm.². The reaction period of time is 3 hours in each run.

Table 3

| Run No. | Reaction temp. (° C.) | Yield (g.) | M.W.×10⁻⁴ |
|---|---|---|---|
| 3-1 | 60 | 5.8 | 170 |
| 3-2 | 70 | 7.4 | 123 |
| 3-3 | 80 | 8.5 | — |
| 3-4 | 90 | 9.2 | 140 |
| 3-5 | 100 | 5.7 | — |
| 3-6 | 110 | 4.3 | — |
| 3-7 | 120 | 6.3 | — |
| 3-8 | 130 | 7.6 | — |
| 3-9 | 150 | 6.6 | — |

The solid polymer recovered is white, grey, and sandy, when the reaction temperature is lower than 90° C., and is somewhat massive, when the temperature is higher than 100° C.

EXAMPLE 4

Different reaction pressures are employed in each of runs of this example. Catalyst used is composed of 0.67 g. of $2TiO_2·P_2O_5$ and 1.0 g. of aluminum triethyl, and solvent is 50 cc. of n-heptane. Polymerization temperature is 80° C. Ethylene is continuously fed to constantly maintain the pressure at a specified value. Reaction period of time is 3 hours.

Table 4

| Run No. | Pressure (kg./cm.²) | Solid polymer, Yield (g.) |
|---|---|---|
| 4-1 | 10 | 2.0 |
| 4-2 | 20 | 4.8 |
| 4-3 | 30 | 5.7 |
| 4-4 | 40 | 8.5 |

The yield is almost proportional to the polymerization pressure.

EXAMPLE 5

A mixture of 5 g. of titanyl pyrophosphate (having been calcined at 500° C.) and 0.5 g. of lithium aluminum hydride, as catalyst, and 50 cc. of n-heptane, as solvent, are charged, and ethylene is fed to the initial pressure of 40 kg./cm.². Polymerization is effected at a temperature of 150° C. After 2.5 hours, the pressure lowers to 8.1 kg./cm.². Ethylene is fed therein again until the pressure rises to 40 kg./cm.², and the reaction is continued for further 3.5 hours. Final pressure is 21.7 kg./cm.². The reaction mixture is worked up by the usual way, whereby 7.7 g. of white solid polymer is obtained.

EXAMPLE 6

The procedure of Example 5 is repeated with the exception that 0.5 g. of calcium hydride is used in place of the lithium aluminum hydride, and polymerization is effected for 9 hours under the same polymerization conditions. Polymerization pressure lowers from 40 kg./cm.² to 28 kg./cm.². Two grams of solid polyethylene is obtained.

EXAMPLE 7

Into an autoclave, 0.67 g. of titanyl pyrophosphate (having been calcined at 500° C.), 1.0 g. of aluminum triethyl and 50 cc. of n-heptane are charged, and ethylene is fed therein to the initial pressure of 30 kg./cm.². Under irradiation of gamma-ray from $Co^{60}$, the reaction is continued for 3.2 hours at room temperature. The dose rate is $9.9 \times 10^4$ roentgens/hr. and total dosage amounts to $3.17 \times 10^5$ roentgens. At the final pressure of 9.05 kg./cm.², 5.2 g. of solid polymer is obtained. If the polymerization is effected without the γ-ray irradiation, only 2.9 g. of solid polymer is obtained.

EXAMPLE 8

Zirconium pyrophosphate ($ZrO_2 \cdot P_2O_5$), formed by the reaction of an aqueous zirconium oxychloride solution with an aqueous phosphate solution, is calcined at 500° C. for 5 hours. 1.17 g. of the zirconium pyrophosphate are placed in an autoclave, in which the air is replaced by nitrogen. Then, 2.0 g. of aluminum triethyl and 50 cc. of heptane are charged under nitrogen atmosphere. The temperature is raised to 80° C. and ethylene is fed therein to 40 kg./cm.² After polymerization for 3 hours, the pressure lowers to 7.1 kg./cm.² Solid polymer, 5.0 g., is obtained.

EXAMPLE 9

4.5 g. of zirconium pyrophosphate, obtained in the similar manner as in Example 8, is treated with hydrogen stream at 400–500° C. for 5 hours, and then charged into an autoclave under ethylene atmosphere. One and a half grams of aluminum triethyl and 50 cc. of heptane are added thereto. The temperature is raised to 150° C. and thereafter ethylene is fed in to 40 kg./cm.² for polymerization. Four hours later, the pressure lowers to 14.9 kg./cm.² Three and a fifth grams of white solid polymer is obtained. The same procedure as above-indicated is repeated, except that the hydrogen treatment is omitted, but ethylene polymerization does not occur substantially.

EXAMPLE 10

An aqueous solution of thorium nitrate, $$Th(NO_3)_4 \cdot 4H_2O$$

is mixed under an efficient stirring with an aqueous solution of diammonium phosphate $(NH_4)_2HPO_4$ to form thorium orthophosphate $Th_3(PO_4)_4 \cdot 4H_2O$ ($3ThO_2 \cdot 2P_2O_5$ in composition). The orthophosphate is calcined at 500° C. for 5 hours.

Similarly as in the foregoing examples, 5 g. of the calcined material, 0.5 g. of aluminum triethyl and 50 cc. of n-heptane are charged into an autoclave, and ethylene is fed therein to 40 kg./cm.² at 150° C. for polymerization. After 7.5 hours, the pressure finally lowers to 9.0 kg./cm.² The reaction mixture is worked up in the same manner as in the foregoing examples, and 1.8 g. of solid polymer and 1.4 g. of liquid polymer are obtained.

EXAMPLE 11

Five grams of titanyl pyrophosphate as described in Example 1 is charged in a reaction vessel, and, then, 0.5 g. of aluminum triethyl and 45 cc. of n-heptane are charged thereto under nitrogen stream with stirring. Propylene is fed therein to 4 kg./cm.² at a room temperature, and, then, subjected to polymerization at 90° C. for 5.5 hours. After cooling, the mixture is treated with methanolic hydrochloric acid, and then washed with methanol by means of a mixer. After drying, grey, somewhat bulky solid, 8.7 g., is obtained. The solid is extracted with heptane and then the residue is further extracted with hot xylene. Total polymeric product consists of 51% heptane-extractable part, 21% xylene-extractable part, and 28% unextractable part. The xylene-extractable part is formed into a film by means of a hot press. The analyses of this film by X-ray and infra-red ray exhibit the crystallinity of 55–60%.

EXAMPLE 12

Five grams of zirconium pyrophosphate, which has been calcined at 500° C. and is obtained in the same manner as in Example 8, is charged in an autoclave, from which air is removed to be substituted with nitrogen. Under nitrogen atmosphere, 0.5 g. of aluminum triethyl and 45 cc. of n-heptane are charged. With stirring of the charged materials, propylene is fed therein to 4 kg./cm.² at a room temperature. Polymerization is effected with stirring at 90° C., for 8.5 hours. After cooling the reaction mixture, 2 g. of white solid polypropylene is recovered therefrom. The polypropylene is subjected to extraction with heptane and then with hot xylene, thereby resulting 43% heptane-extractable part, 26% xylene-extractable part and 31% non-extractable part.

EXAMPLE 13

0.67 g. of titanyl pyrophosphate (having been calcined at 500° C.), 1.0 g. of diethyl zinc and 50 cc. of n-heptane are charged in a vessel. Pure isoprene, 15 g., also is added thereto. The temperature is raised to 150° C. and the polymerization reaction is effected with stirring. After 5 hours, the reaction mixture is treated with methanolic hydrochloric acid to decompose the catalyst. To this mixture, water is added and then the separated heptane layer is distilled to remove heptane. Seven and a fifth grams of yellow viscous liquid polymer is obtained. It contains 1,2-bond, 3,4-bond, cis 1,4-bond and trans 1,4-bond at the proportion of 5.3%, 10.0%, 42.3%, and 42.4%, respectively, as measured by infra-red absorption analysis.

We claim:
1. A catalyst composition comprising (a) a substance of the composition represented by the formula

$$[MeO_2 \cdot (P_2O_5)_x]$$

wherein Me is a metal selected from the group consisting of titanium, zirconium, hafnium and thorium, and $x$ is a number of not more than 2.0, and (b) at least one member selected from the group consisting of hydrides and organometallic compounds of alkali metals, alkaline earth metals, zinc, cadmium, mercury, earth metals and rare earth metals.

2. A catalyst composition comprising (a) a substance of the composition represented by the formula $$[MeO_2 \cdot (P_2O_5)_x]$$

wherein Me is a metal selected from the group consisting of titanium, zirconium, hafnium and thorium, and $x$ is a number of not more than 2.0, said substance having been calcined at a temperature ranging between about 100° C. and about 1200° C., and (b) at least one member selected from the group consisting of hydrides and organometallic compounds of alkali metals, alkaline earth metals, zinc, cadmium, mercury, earth metals and rare earth metals.

3. A catalyst composition according to the claim 1, wherein the Me is titanium, and the $x$ is about ½.

4. A catalyst composition according to the claim 1, wherein the Me is zirconium, and the $x$ is 1.

5. A catalyst composition according to the claim 1, wherein the Me is thorium, and the $x$ is ⅔.

6. A method for polymerizing olefins, comprising contacting an olefin with a catalyst composition comprising (a) a substance of the composition represented by the formula $[MeO_2 \cdot (P_2O_5)_x]$ wherein Me is a metal selected from the group consisting of titanium, zirconium, hafnium and thorium, and $x$ is a number of not more than 2.0, and (b) at least one member selected from the group consisting of hydrides and organometallic compounds of alkali metals, alkaline earth metals, zinc, cadmium, mercury, earth metals and rare earth metals, said olefin being an unsaturated hydrocarbon having 2 to 5 carbon atoms and having at least one polymerizable ethylene double bond.

7. A method for polymerizing olefins, comprising contacting an olefin with a catalyst composition comprising (a) a substance of the composition represented by the formula $[MeO_2 \cdot (P_2O_5)_x]$ wherein Me is a metal selected from the group consisting of titanium, zirconium, hafnium and thorium, and $x$ is a number of not more than 2.0, said substance having been calcined at a temperature ranging between about 100° C. and about 1200° C., and (b) at least one member selected from the group consisting of hydrides and organometallic compounds of alkali metals, alkaline earth metals, zinc, cadmium, mercury, earth metals and rare earth metals, said olefin being an unsaturated hydrocarbon having 2 to 5 carbon atoms and having at least one polymerizable ethylenic double bond.

8. A method according to the claim 6, wherein the Me is titanium, and the $x$ is about ½.

9. A method according to the claim 6, wherein the Me is zirconium, and the $x$ is 1.

10. A method according to the claim 6, wherein the Me is thorium, and the $x$ is ⅔.

11. A method according to the claim 6, wherein said substance (a) has been treated with hydrogen at a temperature of from about 200 to 700° C. prior to use.

12. A method according to the claim 6, wherein the contact of the olefin with the catalyst composition is carried out while the reaction system is exposed to ionizing radiation.

13. Process for making catalyst composition comprising
(1) reacting in aqueous medium at least one water-soluble salt of a metal selected from the group consisting of titanium, zirconium, hafnium and thorium, with a member selected from the group consisting of phosphoric acid and water-soluble phosphoric acid salt,
(2) removing substantially all water from the resultant mixture by evaporation with heat,
(3) calcining the resultant precipitate at a temperature between 300 and 700° C., and
(4) admixing the resultant calcined product with at least one member selected from the group consisting of hydrides and organometallic compounds of alkali metals, alkaline earth metals, zinc, cadmium, mercury, earth metals and rare earth metals.

References Cited by the Examiner
UNITED STATES PATENTS

| | | | |
|---|---|---|---|
| 2,824,073 | 2/58 | Rylander et al. | 252—437 |
| 2,903,404 | 9/59 | Oita et al. | 204—162 |
| 2,909,512 | 10/59 | Bruce | 260—94.9 |
| 2,921,081 | 1/60 | Zimmerschied et al. | 252—437 |

JOSEPH L. SCHOFER, *Primary Examiner.*

M. LIEBMAN, WILLIAM H. SHORT, *Examiners.*